United States Patent
Albonesi et al.

(10) Patent No.: US 10,371,405 B2
(45) Date of Patent: Aug. 6, 2019

(54) BUILDING POWER MANAGEMENT SYSTEMS

(71) Applicant: Cornell University, Ithaca, NY (US)

(72) Inventors: David H. Albonesi, Ithaca, NY (US); Howard Chong, Brooktondale, NY (US); Brandon Hencey, Ithaca, NY (US); Christine A. Shoemaker, Ithaca, NY (US)

(73) Assignee: Cornell University, Ithaca, NY (US)

( * ) Notice: Subject to any disclaimer, the term of this patent is extended or adjusted under 35 U.S.C. 154(b) by 357 days.

(21) Appl. No.: 14/778,956

(22) PCT Filed: Mar. 21, 2014

(86) PCT No.: PCT/US2014/031517
§ 371 (c)(1),
(2) Date: Sep. 21, 2015

(87) PCT Pub. No.: WO2014/153552
PCT Pub. Date: Sep. 25, 2014

(65) Prior Publication Data
US 2016/0061469 A1 Mar. 3, 2016

Related U.S. Application Data

(60) Provisional application No. 61/804,133, filed on Mar. 21, 2013.

(51) Int. Cl.
*H02J 3/14* (2006.01)
*F24F 11/62* (2018.01)
(Continued)

(52) U.S. Cl.
CPC .............. *F24F 11/62* (2018.01); *F24F 11/30* (2018.01); *F24F 11/70* (2018.01); *F24F 11/89* (2018.01);
(Continued)

(58) Field of Classification Search
CPC .......... G05B 2219/2614; G05B 13/048; G05B 2219/2639; G05B 13/0265; G05B 13/0285; F24F 2011/0075; F24F 11/0034
See application file for complete search history.

(56) References Cited

U.S. PATENT DOCUMENTS

| | | | | |
|---|---|---|---|---|
| 5,927,598 A | * | 7/1999 | Broe | ........................ H02J 3/14 236/46 R |
| 9,612,591 B2 | * | 4/2017 | Sloop | ...................... G05B 15/02 |

(Continued)

OTHER PUBLICATIONS

"LoCal (A Network Architecture for Localized Electrical Energy Reduction, Generation and Sharing).http://local.cs.berkeley.edu/wiki2/index.php/Main_Page."

(Continued)

*Primary Examiner* — Darrin D Dunn
(74) *Attorney, Agent, or Firm* — Perkins Coie LLP

(57) ABSTRACT

Methods, systems, and devices are disclosed for managing building power, in one aspect, a method for managing building power includes determining values for power usage of a heating, ventilation, or air conditioning (HVAC) system in one or more zones of a building, the values including a cost of power value, a comfort value, a weighting function between the cost of power value and the comfort value, or a thermal storage value, in which the determining the values is based on a plurality of parameters including a price of power, a time of use, a total power allocation, or random variables including weather and building occupancy factors, and determining a power level for a plurality of states based on the determined values, the plurality of states corresponding to different levels of power to operate the HVAC system in the one or more zones.

20 Claims, 9 Drawing Sheets

(51) Int. Cl.

| | | |
|---|---|---|
| *G05B 15/02* | (2006.01) | |
| *F24F 11/30* | (2018.01) | |
| *F24F 11/70* | (2018.01) | |
| *F24F 11/89* | (2018.01) | |
| *F24F 110/00* | (2018.01) | |
| *F24F 110/10* | (2018.01) | |
| *F24F 120/10* | (2018.01) | |
| *F24F 120/12* | (2018.01) | |
| *F24F 120/14* | (2018.01) | |
| *F24F 140/50* | (2018.01) | |
| *F24F 140/60* | (2018.01) | |
| *F24F 120/20* | (2018.01) | |
| *F24F 11/65* | (2018.01) | |
| *F24F 11/56* | (2018.01) | |
| *F24F 11/46* | (2018.01) | |

(52) U.S. Cl.
CPC ............... *G05B 15/02* (2013.01); *H02J 3/14* (2013.01); *F24F 11/46* (2018.01); *F24F 11/56* (2018.01); *F24F 11/65* (2018.01); *F24F 2110/00* (2018.01); *F24F 2110/10* (2018.01); *F24F 2120/10* (2018.01); *F24F 2120/12* (2018.01); *F24F 2120/14* (2018.01); *F24F 2120/20* (2018.01); *F24F 2140/50* (2018.01); *F24F 2140/60* (2018.01); *G05B 2219/2614* (2013.01); *H02J 2003/143* (2013.01); *Y02B 70/3225* (2013.01); *Y02B 70/3266* (2013.01); *Y02B 70/3275* (2013.01); *Y04S 20/222* (2013.01); *Y04S 20/224* (2013.01); *Y04S 20/242* (2013.01); *Y04S 20/244* (2013.01)

(56) References Cited

U.S. PATENT DOCUMENTS

| | | | | |
|---|---|---|---|---|
| 2004/0059815 | A1* | 3/2004 | Buckingham | H04L 12/2803 709/224 |
| 2009/0157529 | A1 | 6/2009 | Ehlers et al. | |
| 2010/0318226 | A1 | 12/2010 | Augusto et al. | |
| 2011/0046805 | A1* | 2/2011 | Bedros | H04L 12/2809 700/291 |
| 2011/0153090 | A1* | 6/2011 | Besore | G05B 15/02 700/278 |
| 2011/0155354 | A1 | 6/2011 | Karamanos et al. | |
| 2013/0190940 | A1* | 7/2013 | Sloop | G05B 15/02 700/291 |
| 2013/0338837 | A1* | 12/2013 | Hublou | G05D 23/1923 700/278 |
| 2014/0039690 | A1* | 2/2014 | Steinberg | F24F 11/0034 700/276 |
| 2014/0277769 | A1* | 9/2014 | Matsuoka | G06Q 50/06 700/278 |
| 2014/0365017 | A1* | 12/2014 | Hanna | F24F 11/001 700/276 |
| 2015/0363728 | A1* | 12/2015 | Patel | G06Q 10/06315 705/7.23 |
| 2016/0327295 | A1* | 11/2016 | Ward | G05B 15/02 |

OTHER PUBLICATIONS

Bernal et al., "MLE+: A Tool for Integrated Design and Deployment of energy efficient Building Controls", In Proceedings of the Fourth ACM Workshop on Embedded Sensing Systems for Energy-Efficiency in Buildings, BuildSys '12, p. 123130, New York, NY, USA, 2012. ACM.

Bliznyuk et al., "Bayesian Calibration of Computationally Expensive Models Using Optimization and Radial Basis Function Approximation", Journal of Computational and Graphical Statistics, 17(2):1-25, 2008.

Borrelli et al., On the computation of linear model predictive control laws:, Automatica, 46(6):1035-1041, Jun. 2010.

Alessio et al., "A Survery on Explicit Model Predictive Control", In Nonlinear Model Predictive Control, vol. 384 of Lecture Notes in Control and Information Sciences, pp. 345-369.

Brambley et al., "Advanced Sensors and Controls for Building Applications: Market Assessment and Potential R&D Pathways", Prepared by Pacific Northwest National Laboratory for the US Department of Energy, PNNL Report No. PNNL-15149, April. Available at: http://www. eere. energy. gov/buildings/tech/controls/pdfs/pnnl-15149 market assessment. pdf, 2005.

Chen et al., Applying Experimental Design and Regression Splines to High-Dimensional Continuous-State Stochastic Dynamic Programming:, Operations Research, 47(1):pp. 38-53, 1999.

Chong, "Building vintage and electricity use: Old homes use less electricity in hot weather", European Economic Review, 2012, pp. 906-930.

Crawley et al., "Contrasting the capabilities of building energy performance simulation programs", Building and Environment, 43(4), Apr. 2008, pp. 661-673.

Deng et al., "Building thermal model reduction via aggregation of states", In Proceedings of American Control Conference, 2010, pp. 5118-5123.

Dobbs et al., "Automatic Model Reduction in Architecture: A Window Into Building Thermal Structure", Fifth National Conference of IBPSA-ISA, Aug. 2012, pp. 562-568.

Dobbs et al., "A Comparison of Thermal Zone Aggregation Methods", In Proceedings of the IEEE Conference on Decision and Control, page to appear, Dec. 2012, pp. 6938-6944.

Georgescu et al., "Creating zoning approximations to building energy models using the koopman operator", Fifth National Conference of IBPSA-USA, Aug. 2012, pp. 40-47.

Ferreau et al., "An online active set strategy to overcome the limitations of explicit MPC", International Journal of Robust and Nonlinear Control, 18(8):816-830, May 2008.

Geller et al., "The Experience With Energy efficiency Policies and Programmes in IEA Countries Learning from the Critics", IEA Information Paper, 2005.

Giselsson et al., "Distributed Model Predictive Control with Suboptimality and Stability Guarantees", In 2010 49th IEEE Conference on Decision and Control (CDC), pp. 7272-7277. IEEE, Dec. 2010.

Goldstein et al., "A room with a viewpoint: Using social norms to motivate environmental conservation in hotels", Journal of Consumer Research, 35(3):472-482, 2008.

Greenberg et al., "Sustain: an experimental test bed for building energy simulation", Energy and Buildings, 58, 2012, pp. 44-57.

Henze et al., "Evaluation of optimal control for active and passive building thermal storage", International Journal of Thermal Sciences, 43(2):173-183, Feb. 2004.

Johnson et al., "Numerical solution of continuous-state dynamic programs using linear and spline interpolation", Operations Research, 41(3):pp. 484-500, 1993.

Joskow et al., "Wat Does a Negawatt Really Cost? Evidence from Utility Conservation Programs", The Energy Journal, pp. 41-74, 1992.

Kelman et al., "Analysis of Local Optima in Predictive Control for Energy Efficient Buildings", In 2011 50th IEEE Conference on Decision and Control and European Control Conference (CDC-ECC), pp. 5125-5130, Dec. 2011.

Krioukov et al., "Building Application Stack (BAS)", In Proceedings of the Fourth ACM Workshop on Embedded Sensing Systems for Energy-Efficiency in Buildings, BuildSys '12, pp. 72-79, New York, NY, USA, 2012. ACM.

Ma et al., "Economic Model Predictive Control for Building Energy Systems", In Innovative Smart Grid Technologies (ISGT), 2011 IEEE PES, pp. 1-6, Jan. 2011.

Ma et al., "Model Predictive Control of Thermal energy Storage in Building Cooling Systems", IEEE Transactions on Control Systems Technology, 20(3):796-803, 2012.

Ma et al., "Predictive control for energy efficient buildings with thermal storage: Modeling, stimulation, and experiments", IEEE Control Systems, 32(1):44-64, Feb. 2012.

(56) References Cited

OTHER PUBLICATIONS

Ma et al., "A distributed predictive control approach to building temperature regulation", In American Control Conference (ACC), 2011, pp. 2089-2094.

Majumdar et al., "Energy-Aware Meeting Scheduling Algorithms for Smart Buildings", In Proceedings of the Fourth ACM Workshop on Embedded Sensing Systems for Energy-Efficiency in Buildings, BuildSys '12, pp. 161-168.

Meier et al., "How People Actually Use Thermostats" Technical report, Ernest Orlando Lawrence Berkeley National Laboratory, Berkeley, CA (US), 2010.

Miller, "Saving energy: It starts at home", National Geographic, 215(3):60-81, 2009.

Millett et al., "Computing Research for Sustainability", The National Academies Press, 2012.

Morosan et al., "A distributed MPC strategy based on Benders' decomposition applied to multi-source multi-zone temperature regulation", Journal of Process Control, 21(5):729-737, Jun. 2011.

Muller et al, "SO-I: a surrogate model algorithm for expensive nonlinear integer programming problems", J Glob Optim, 2014, 59, pp. 865-889.

Mugunthan et al., "Assessing the impacts of parameter uncertainty for computationally expensive groundwater models", Water Resources Research, 42, 2006, 15 pages.

Mugunthan et al., "Comparison of function approximation, heuristic and derivative-based methods for automatic calibration of computationally expensive groundwater bioremediation models", Water Resources Research, 41, 2005, 17 pages.

Privara et al., "Model predictive control of a building heating system: The first experience", Energy and Buildings, 43, 2011, pp. 564-572.

Rawlings et al., "Coordinating multiple optimization-based controllers: New opportunities and challenges", Journal of Process Control, 18(9):839-845, Oct. 2008.

Regis et al., "Constrained global optimization of expensive black box functions using radial basis functions", J. of Global Optimization, 31(1):153-171, 2005.

Regis et al., "A stochastic radial basis function method for the global optimization of expensive functions", Informs Journal on Computing, 19(4):497-509, 2007.

Regis et al., "Local Function Approximation in Evolutionary Algorithms for the Optimization of Cosstly Functions", IEEE Transactions on Evolutionary Computation, 8(5):490-505, 2004.

Regis et al., "Improved strategies for radial basis function methods for global optimization", Journal of Global Optimization, 37(1):113-135, 2007.

Regis et al., "Parallel Stochastic Global Optimization Using Radial Basis Functions", Informs Jn. of Computing, 21 (3), 2009, pp. 411-426.

Regis et al., "Parallel radial basis function methods for the global optimization of expensive functions", European Journal of Operational Research, 182(2), 2007, pp. 514-535.

Rijksen et al., "Reducing peak requirements for cooling by using thermally activated building systems", Energy and Buildings, 42(3):298-304, Mar. 2010.

Scattolini, "Architectures for distributed and hierarchical model predictive control—a review", Journal of Process Control, 19(5):723-731, May 2009.

Scofield, "Do LEED-certified buildings save energy? not really . . . ", Energy and Buildings, 41(12):1386-1390, Dec. 2009.

Shoemaker et al., "Watershed calibration using multistart local optimization and evolutionary optimization with radial basis function approximation", Hydrological Sciences Journal, 52(3):450-465, 2007.

Stoustrup, "Plug & play control: Control technology towards new challenges", European Journal of Control, 3:1-20, 2009.

US Department of Energy, "2009 Residential energy Consumption Survery (RECS) Technical Documentation—Summary", US Department of Energy, http://www.eia.gov/consumption/residential/, 2009.

Wetter et al., "Modelica versus TRNSYS—A comparison between an equation-based and a procedural modeling language for building energy simulation", In Proceedings of the SimBuild, 2nd National Conference of IBPSAUSA, 2006.

Wetter et al., "A modular building controls virtual test bed for the integration of heterogeneous systems", In Third National Conference of IBPSA-USA, Berkeley/California, https://gaia. lbl. gov/bcvtb, 2008.

Wild et al., "ORBIT: optimization by radial basis function interpolation in trust-regions", Siam J. on Scientific Computing, 30(6):3197-3219, 2008.

Wild et el., "Global convergence of radial basis function trust region derivative-free algorithms", Siam Journal on Optimization, 21(3):761-781, 2011.

Winter et al., "Scheduling Algorithms for Unpredictably Heterogeneous CMP Architectures", In Proc. 38th International Conference on Dependable Systems and Networks, Jun. 2008.

Winter et al., "Scalable Thread Scheduling and Global Power Management for Heterogeneous Many-Core Architectures", In Proc. 19th IEEE/ACM Int'l Conference on Parallel Architectures and Compilation Techniques, pp. 29-39, Sep. 2010.

Zhang et al., "Energy aspects of HVAC system Configurations—Problem definition and test cases", HVAC&R Research, 12(sup3):871-888, 2006.

International Search Report and Written Opinion for PCT Application No. PCT/US2014-031517, dated Aug. 27, 2014, 8 pages.

* cited by examiner

BUILDING POWER MANAGEMENT SYSTEMS

CROSS-REFERENCE TO RELATED APPLICATIONS

This patent document is a 35 USC § 371 National Stage application of International Application No. PCT/US2014/031517 filed Mar. 21, 2014, which claims benefit of priority of U.S. Provisional Patent Application No. 61/804,133, entitled "BUILDING POWER MANAGEMENT STACKS," and filed on Mar. 21, 2013. The entire content of the aforementioned patent applications are incorporated by reference as part of the disclosure of this patent document.

TECHNICAL FIELD

This patent document relates to building power management technologies.

BACKGROUND

Heating, ventilation, and air conditioning (HVAC) technologies can be used to provide systems, devices, and methods for controlling conditions of buildings to meet certain comfort needs and other specific needs in using or managing HVAC controlled buildings. HVAC system design and engineering are generally based on the principles of various technical fields including, thermodynamics, fluid mechanics, heat transfer, electricity power management and others. HVAC technologies have been implemented for building indoor and automotive environmental comfort of occupants. For example, HVAC is important in medium to large industrial and office buildings, e.g., such as skyscrapers, where safe and healthy building conditions are regulated with respect to temperature and humidity, using fresh air from outdoors.

SUMMARY

Techniques, systems, and devices are disclosed for implementing an integrated building power management control system.

The disclosed integrated building power management system includes a hierarchical computer control software architecture for managing building power using a cyber-physical system. In some implementations, the architecture of the integrated building power management system is arranged in a hierarchy of control levels of hardware and software systems, also referred to herein as 'stacks'. For example, e.g., the system levels can be controlled using software hierarchical layers that receive information from, and perform various decision making processes for controlling electrical power distribution and consumption at, various locations and appliances in buildings based on a computer controlled network of sensors and power control devices in the buildings to enable dynamic power management based on real time power needs to provide energy efficient electrical power systems for buildings.

In one aspect of the disclosed technology, a method for managing building power includes determining values for power usage of a heating, ventilation, or air conditioning (HVAC) system in one or more zones of a building, the values including a cost of power value, a comfort value, a weighting function between the cost of power value and the comfort value, or a thermal storage value, in which the determining the values is based on a plurality of parameters including a price of power, a time of use, a total power allocation, or random variables including weather and building occupancy factors, and determining a power level for a plurality of states based on the determined values, the plurality of states corresponding to different levels of power to operate the HVAC system in the one or more zones.

In another aspect, a building power management system includes a heating, ventilation, or air conditioning (HVAC) system in one or more zones of a building capable of operating in a plurality of states, in which the plurality of states use different levels of power to operate the HVAC system, and a module that determines a power level for the plurality of states of the HVAC system, in which the module determines the power level based on a cost of power value, a comfort value, a weighting function between the cost of power value and the comfort value, or a thermal storage value.

In another aspect, a computer program product comprising a nonvolatile computer-readable storage medium having instructions stored thereon, the instructions including code for storing a definition of a plurality of states in a heating, ventilation, or air conditioning (HVAC) system in one or more zones of a building, the states corresponding to different levels of power to operate the HVAC system, code for determining values for power usage, the values including a cost of power value, a comfort value, a weighting function between the cost of power value and the comfort value, or a thermal storage value, in which the code determines the values based on a plurality of parameters including a price of power, a time of use, a total power allocation, or random variables including weather and building occupancy factors, and code for determining a power level for the states based on the determined values for power usage.

In yet another aspect, a system is provided for managing power in a building and includes hardware sensors distributed in a building to obtain measurements and data from the building; and one or more computer servers in communication with the hardware sensors and power appliances in the building including appliances for heating, ventilation, or air conditioning (HVAC) in the building. The one or more computer servers include software modules that receive sensor data from the hardware sensors, receive information on preferences or requests from building occupants, process information in the sensor data received information from building occupants to dynamically optimize operations of power appliances and use of building resources to generate optimized power state settings of the power appliances in the building, and send control sequences to the power appliances in the building to operate according to the optimized power state settings.

The above and other aspects and their implementations are described in greater detail in the drawings, the description and the claims.

DETAILED DESCRIPTION

Figure 1:
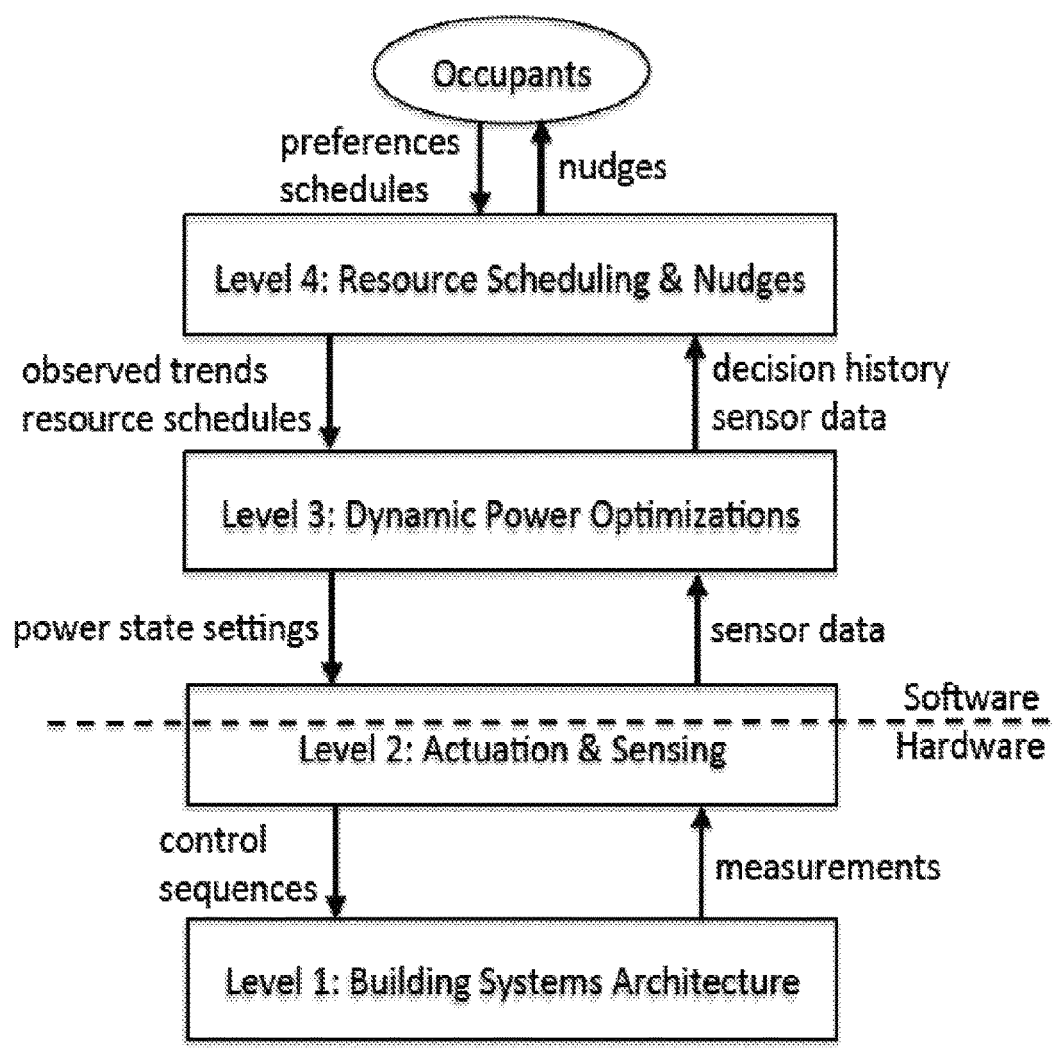
FIG. 1 shows a block diagram of an exemplary building power management stack showing a layered hardware/software architecture.

The energy consumption of buildings is of growing worldwide concern. Some statistics indicate that buildings constitute about 40% of the total U.S. energy consumption, and about half of that is for space heating and cooling. Moreover, approximately 76% of the energy consumed by the building sector in U.S. is derived from fossil fuels that contribute to climate change. As modern buildings based on HVAC technologies are being rapidly built around the world, building power use management is an important issue that significantly impacts multiple sectors including energy, environment, business, residential, financial, manufacturing and others.

Cyber-Physical Systems (CPS) are systems of collaborating computational elements that are used to control physical entities. The disclosed technology focuses on creating Cyber-Physical Systems to reduce building energy consumption and dramatically improve building energy efficiencies. Techniques, systems, and devices are described for implementing of an integrated building power management control system (BPMS) including a hierarchy of control levels of hardware and software systems or stack. The disclosed BPMS technology can be used as a workable framework to comprehensively address building energy efficiency incorporating and unifying ideas from currently separated fields.

The disclosed integrated building power management system includes a hierarchical computer control software architecture for managing building power using a cyber-physical system. In some implementations, the architecture of the integrated building power management system is arranged in a hierarchy of control levels or stacks of hardware and software systems. For example, the system levels can be controlled using software hierarchical layers that receive information from, and perform various decision making processes for controlling electrical power distribution and consumption at, various locations and appliances in buildings based on a computer controlled network of sensors and power control devices in the buildings to enable dynamic power management based on real time power needs to provide energy efficient electrical power systems for buildings.

Various implementations of building energy management use an ad hoc process characterized by a component-by-component approach. Building occupants demand comfort at their particular sections of a large HVAC controlled building without considering the overall HVAC operations of the building, including power efficiency, operating cost or systems limitations. In such systems, building operators tediously tune building operational parameters using simple control rules to meet the demands of building occupant demands or requirements. Power control levers, such as night setbacks to conserve power, are typically statically set, coarse-grain, and conservative. At the sensor and actuator level, legacy building systems are incompatible with the temporal and spatial scales of real time building events, and are unable to scale between large and small building environments. Recent proposals for adapting building systems to weather and occupant behavior are hindered by these hardware limitations. The building and its HVAC system may have been built with little forethought of the constraints that would ultimately be placed on how the building could be operated.

The disclosed technology provides a new control architecture and modality of building power management. In some embodiments, the disclosed Building Power Management Stack (BPMS) technology uses a hardware/software hierarchy for power management in buildings to provide an integrated cyber-physical system where sophisticated sensing and artificial intelligence, system optimization and sensing/actuation are applied to the physical system of building power management.

In some exemplary implementations of the integrated building power management systems, elements of an exemplary BPMS system can be implemented by using off-the-shelf internet-enabled thermostats. For example, a pilot BPMS program was deployed and logged HVAC use and measurements of temperature for 10 buildings over several weeks at 10 minute intervals. The disclosed technology can scale to different levels of sensors for buildings of different sizes, e.g., 1600 thermostats in 1600 buildings, to provide real world data. Exemplary data from the exemplary implementations differentiates from other projects who rely solely on simulations without a field component. The exemplary implementations described including use of simulation and research showing a successful cyber-physical system that has real-world applicability. The disclosed technology can be deployed in the field to include consummate engineering challenges that are entailed in the immense variations of buildings, e.g., such as 1860's Victorians to 2010's LEED Platinum houses and all building in between.

In one exemplary embodiment, a BPMS system of the disclosed technology can include three successive hierarchical layers, e.g., which can be implemented in software integrated across a plurality of computer systems, sensors, and building power control devices. The exemplary BPMS system can include a Building Systems Architecture layer, an Actuation & Sensing layer, and a Dynamic Power Optimizations layer. In some embodiments, for example, the exemplary BPMS system can include a fourth layer of a Resource Scheduling & Nudges layer.

FIG. 1 shows a block diagram of an exemplary BPMS showing a layered hardware/software architecture.

The exemplary Building System Architecture at the lowest layer, Layer 1, implements the architecture and controls for defined active and sleep states within each HVAC zone. The building systems are designed for rapid state-to-state transitioning for fine-grain power management. The Layer 1 essentially represents the hardware portion of the building, including, heaters, ACs, ventilation systems, lighting systems, electrical power switches and others. Building Systems Architecture Building HVAC systems must be reengineered to enable fine-grain power management, specifically multiple active and sleep states with rapid state-to-state transition times. Innovations here such as zoned heating, heat pumps, and building insulation describe how building heat can be delivered and how quickly heat leaks from the building.

In operation, the Building System Architecture at Layer 1 allows for physical measurements of the building conditions or parameters associated with the building power management and communicate the measurements to higher levels for further processing. In addition, the Building System Architecture at Layer 1 receives control sequences for specific hardware devices or systems in the building to carry out operations contained in the received control sequences.

Above the hardware Layer 1 is Layer 2 for Sensing and Actuation layer which includes both (1) hardware components, devices and systems and (2) software modules or processes. The hardware portion of the Layer 2 includes the Sensor Layer of various sensors and detectors distributed in the building, such as thermostats for temperature measurements and optical sensors for measurements of illumination levels, motion sensors for detecting motion of personal or objects, cameras, and various other sensors such smoke detectors, etc. The Sensor layer includes hardware sensors for sensing physical parameters or conditions such as temperature, humidity, air flow, motion detection, cameras and others. In addition, the Sensor Layer also includes software based modules for sensor data processing as "soft sensors" such as smartphone-based tracking of location and movement of occupants, and schedules of building activities, e.g., meeting schedules and sleeping room occupancy schedules for a hotel). Over time, this characterizes the relationship between heating inputs and system state as well as the likely use of the building (e.g., fully occupied from 7 am-7 pm, unoccupied 50% of the time from 7 pm-1 pm, unoccupied 100% of the time from 11 pm-7 am). Layer 2 can then define energy-saving building states called sleep states. For example, two low energy states can be a "nap" state and a "hibernate" state in which the energy consumption can be reduced significantly from the normal operation of the building. Actuation part of Layer 2 involves translation of high-level power management commands ("put resource X into the nap state") to the control of blowers, vents, and the like.

The Layer 2 uses its sensors to obtain the measurements from the Layer 1 to produce processed measurements based on desired data communication protocols, including processed sensor data and other measurements of the building. This processed measurements are directed to higher layers for further processing. For example, the Sensing and Actuation layer (Layer 2) abstracts the physical control of the building resources. The Layer 2 also receives information or commands from higher levels such as power state settings to be implemented in Layer 2-generated control sequences to be executed by Layer 1.

The next higher layer is Layer 3 for Dynamic Power Optimizations ("The Power Manager layer") and includes various software modules for processing the received sensor data from Layer 2 and for performing analysis for power management optimizations. For example, the Power Manager layer can be configured or designed to minimize overall building power costs while meeting comfort needs. For another example, the Power Manager layer interfaces with the Actuation and Sensing layer (Layer 2) to assess the inside and outside environment and the building occupants, and to dynamically control the power states of the building resources. The minimization of energy use for a building with a large number of resources, e.g., tens to hundreds of resources in some large buildings, is formulated as a large-scale optimization problem that is solved through stochastic dynamic programming with surrogates. One notable feature of a realistic Power Manager is that it assesses the degree of uncertainty of weather and occupant actions and factors these into power management decisions, i.e., when to use the nap versus hibernate states.

As illustrated in FIG. 1, the Power Manager Layer (Layer 3) processes the sensor data and other information from Layer 2 to produce decision history and sensor data to the next higher layer (Layer 4) and receives observed trends in the building power usage and resource schedules for various resources of the building from Layer 4. Layer 3 also performs its optimization processing to generate the power state settings to be transmitted to Layer 3 for execution.

The top layer is Layer 4 that includes software modules for Resource Scheduling and Nudges. While the Power Manager layer largely reacts to changes in weather, building environment, and occupant actions, the Scheduler function in Layer 4 can be designed to proactively affect building occupants to take power-friendly actions. Layer 4 achieves this via various ways, including using periodic spatial and temporal allocation of building resources to building occupants and nudging building occupants to consider energy-efficiency measures. The Layer 4 has an interface to interact with building occupants which allows the Layer 4 to receive occupant preferences, schedules or requests and to send suggestions, recommendations, rewards or other incentives to building occupants as "nudges" to encourage building occupants to power-friendly actions that would generally provide better power efficiency.

The exemplary stack approach to building power management is innovative and critical to successful real world application. Each layer of the stack can be implemented to interact with the successive layers. For example, in a cyber-physical system, the exemplary Layer 4 behavioral nudges cannot be implemented if Levels 2 occupancy sensors are not available. Furthermore, for example, Level 1 may not allow the heating of individual zones/rooms of a house, constraining the advantages of intelligent scheduling. The variation across buildings is incredibly vast in terms of size, thermal properties, and uses. The BPMS is general enough to handle this variation, and can utilize abstractions and protocols that reduces the complexity to a manageable level.

The exemplary BPMS model is inspired by the highly effective power management system implemented in today's power constrained computer systems. Physical HVAC systems, like computer systems of years past, are largely performance-focused, over-designed, and ill-equipped for dynamic power management. For computer systems, the Advanced Configuration and Power Interface (ACPI) standard defines a hierarchical hardware and software structure for fine-grain power management in real time by the operating system. ACPI is most widely known by the sleep and hibernate power modes available on personal computers, but this is only a small part of the full interface. ACPI defines operating modes for components engineered for dynamic power control, their required properties, and interfaces (commands and registers) to software, to permit querying the status of the component and controlling its operating mode.

In 2012, the National Academies Press published Computing Research for Sustainability and highlighted the need for practicality in approaches to real-world problems:

"CS research on sustainability is generally best approached not by striving for universality from the start, but instead by beginning from the bottom up: that is, by developing well-structured solutions to particular, critical problems in sustainability, and later seeking to generalize these solutions . . . . [An effective CS contribution] must first have the potential to make a real difference in moving toward a more sustainable future. Embracing the concrete will help researchers hone and filter their approaches, and multiple and adapted applications will emerge."

The disclosed technology applies these principles in an exemplary formulation of the development of the BPMS. The exemplary stack neatly organizes how CS can make a real world difference. For example: it makes no difference to have an optimization algorithm for daily HVAC if each iteration takes a week to run. The building design for a new building is an important choice, but the building design for an existing building is often an important constraint.

The patent document includes the following sections. First, described is an analogy between ACPI and BPMS. Second, each exemplary layer of the stack is described including the disciplinary techniques that can be used in developing that feature of the stack. Third, exemplary implementation plans including deployment of the BPMS with internet-enabled thermostats are presented. Lastly, social, economic, and public policy implications are discussed.

ACPI and BPMS

Table 1 compares the ACPI developed to dramatically reduce energy used in computer systems with the BPMS which can dramatically reduce energy used in building HVAC systems. Before ACPI ("Old Way" in Table 1), computer systems implemented static power policies, were engineered to handle worst case power loads, required conservative power control, and power management was ad hoc and uncoordinated, due to the lack of interface standards and components engineered primarily for performance.

TABLE 1

Comparison of ACPI and BPMS

|  | ACPI | BPMS |
|---|---|---|
| Old way | Static | Static |
|  | Over-engineered | Over-engineered |
|  | Conservative control algorithm | Conservative control algorithm |
|  | Non-integrated | Non-integrated |
| New Way | Dynamic | Dynamic |
|  | Economically engineered | Economically engineered |
|  | Fine-tuned control algorithm | Fine-tuned control algorithm |
|  | Integrated | Integrated |
| Result | Energy savings without compromising computing performance | Energy savings without compromising occupant comfort |

TABLE 2

Details of the New Way for ACPI and BPMS

|  | ACPI | BPMS |
|---|---|---|
| Dynamic | Hibernate, sleep, and active states for computer. Screensavers | Hibernate, nap, and active states for thermal comfort. |
| Economically engineered | Sizing of processing needs balances cost vs performance. | Sizing of comfort needs balances cost vs performance. |
| Fine-tuned control algorithm | Activity monitors with shut down and rapid wake up of devices depending on usage. Dynamic Voltage and Frequency Scaling (DVFS) | Occupant sensors with shut down and rapid re-condition of zones depending on occupancy. Dynamic Conditioning Scaling (DCS) |
| Integrated | ACPI stack allows integrated power management. | BPMS stack allows integrated power management. |

The development of the ACPI standard drove dramatic improvements in computer systems power management (details in Table 2):

(1) Components were reengineered to implement multiple power states with well-defined properties (operating capabilities, power levels, transition times), that could be dynamically controlled in real time through a well-defined interface that abstracted unnecessary engineering details.

(2) Control algorithms were developed to shut down components based on utilization, or to trade throughput for power savings in real time, e.g., Dynamic Voltage and Frequency Scaling (DVFS) algorithms, by controlling the component power states.

(3) The ACPI stack of well-defined hardware and software layers enabled coordinated, integrated approaches to power management, compared to the collection of uncoordinated piecemeal approaches of years past.

(4) Computer systems could be more economically engineered—for less than the worst case power load-due to a greater understanding of power/performance tradeoffs and the ability to dynamically trade off performance for power savings in a known manner.

Similar to ACPI, the disclosed BPMS progresses building power management from current overly conservative ad hoc methods to an integrated layered approach with well-defined operating modes and more aggressive fine-grain power management techniques (right side of Table 2):

(1) Central to the BPMS approach is the reengineering of buildings to accommodate multiple power states with similar characteristics as ACPI power states, including rapid sleep-to-active transition times, and a well-defined high-level control interface.

(2) The new power states permit fine-grain power management of building spaces based on occupancy, through shutdown of unoccupied spaces and through Dynamic Conditioning Scaling, the trading of comfort for power savings in occupied spaces in real time.

(3) The BPMS stack of well-defined hardware and software layers enables coordinated, integrated approaches to power management of buildings, compared to the collection of uncoordinated piecemeal approaches of today.

(4) BPMS allows a greater understanding of the comfort versus power tradeoffs. The ability to control this tradeoff in real time in a well-understood manner permits economic engineering of building HVAC systems.

Referring back to FIG. 1, the exemplary BPMS system shows four interactive, hierarchical layers. The exemplary Actuation and Sensing layer at Layer 2 is the interface between the building hardware and the power management control software at Level 3. Each HVAC zone contains a control module that translates high-level commands into low-level hardware actions, e.g., such as controlling the speed of a fan or querying the status of a zone. Sensors located throughout the building provide feedback on building environment, weather, energy sources and pricing, and occupants, including schedules of building activities.

The exemplary Dynamic Power Optimizations at Level 3 (the "Power Manager") trades power for comfort to meet objectives. It uses optimization and prediction algorithms to determine the optimal set of power states for all building zones. The algorithm accounts for variable events and uncertainties—for example, such as the likelihood of the unexpected use of a currently unoccupied zone, the price of energy on the grid, or predicted weather-in selecting among the active and power states.

The exemplary Resource Scheduling and Nudges layer at Level 4 mines the filtered sensor data from the Level 2 interface to improve energy efficiency. It discovers trends that are passed to Level 3 to improve its optimization. It learns preferences from building occupants and "nudges" them to take actions that are more energy-friendly. It achieves long term power savings through energy-aware assignment of schedulable building resources such as meeting rooms in an office building.

Layer 1: Building Systems Architecture

The exemplary Level 1 Building Systems Architecture is the primary hardware component of the stack and determines what is achievable by the building. The important properties are first (capital and installation) cost, operating cost, and recovery time between BPMS states. For example, the recovery time of a zone from sleep to active is governed by the capacity and throughout of the physical system. With an appropriate building systems architecture (Level 1) and coordination via dynamic power optimization (Level 3) throughput can be maximized and capacity can be recruited from other areas in the building.

The physical building design places critical limitations on the achievable performance of energy systems. Specifically, the historically siloed nature of building design has typically left building automation systems as an afterthought. In contrast, whole building design seeks to achieve greater building performance through an integrated concurrent versus sequential design team. In that spirit, the disclosed technology investigates how practical physical plant designs can enable high performance building performance management.

For example, it is a common misconception that the innovation in building energy efficiency is driven by the individual component efficiencies. Although component-level efficiencies have significantly improved in recent decades, most of the untapped potential lies in the systems integration. Consequently, a key energy efficiency enabler is the architecture of the building systems. Increased energy performance may be achieved by (1) elimination of simultaneous heating and cooling, (2) spatial/temporal redistribution of heating/cooling loads, (3) alignment of occupant, thermal, and HVAC zoning.

Simultaneously Heating and Cooling. The cooling and subsequent reheating of the air before reaching its usage point is a common source of energy waste in buildings. In general, simultaneous heating and cooling is driven by incompatible ventilation and heating/cooling demands in multiple zones being met by a single air-handling unit. For example, a common HVAC (single-duct) configuration draws in outside air for ventilation, centrally cools the air, distributes to the zones, and reheats in variable-air-volume (VAV) boxes as needed. In this scenario, if zone A needs a lot of cooling and zone B needs a lot of ventilation, then zone A will receive too much ventilation and zone B will receive too much cool air that must be reheated. As an alternative, fan coils units alleviate simultaneous heating and cooling by decoupling the ventilation from heating and cooling.

Spatial/Temporal Redistribution of Loads. Spatial redistribution of heating or cooling loads allows the redistribution of the load from one space to another. For example, a cooling load in one space might be met by moving the excess heat to a space that has a heating load. Consider a typical office building with two zones, east and west, served by fan coil units. Suppose the east side has an 8 unit (e.g., kW, ton, Btu/hr) cooling load, due to the early morning sun. Conversely, the west side is shaded and has an 8 unit heating load. An air-conditioner using 2 units, giving an effective coefficient of performance (COP) of 4 (e.g., COP is the ratio of energy input to heat transferred), meets the cooling load. A boiler using 8 units meets the heating load. Thus, energy is consumed at a rate of 10 units with no load redistribution. Instead, suppose the building is equipped with a heat pump loop that enables load redistribution. The heat pump loop consists of a heat pump in each zone, the hydronic loop serving as the thermal reservoir, and the hydronic loop circulating water among the heat pumps. Assuming the heat pumps also have a COP of 4, the heat pump on the east side would consume approximately 2 units to transfer 8 units of excess heat to the west side via the hydronic loop. As a result, the heat pump loop architecture yields an approximate 80% energy savings.

Temporal redistribution passively or actively stores thermal energy for later use. The most common form of temporal redistribution is pre-cooling the building. For example, the building thermal mass is cooled earlier in the day by overcooling the air while it is more efficient to do so, and cooling loads are significantly reduced later in the day. Similarly, a similar effect may be achieved using active thermal storage such as chilled water storage. Through effective dynamic power optimization, thermal energy storage has demonstrated an improvement of 26% in total building operating costs, 58% in HVAC operating costs, 19.1% in chilled water plant cost.

Figure 2:
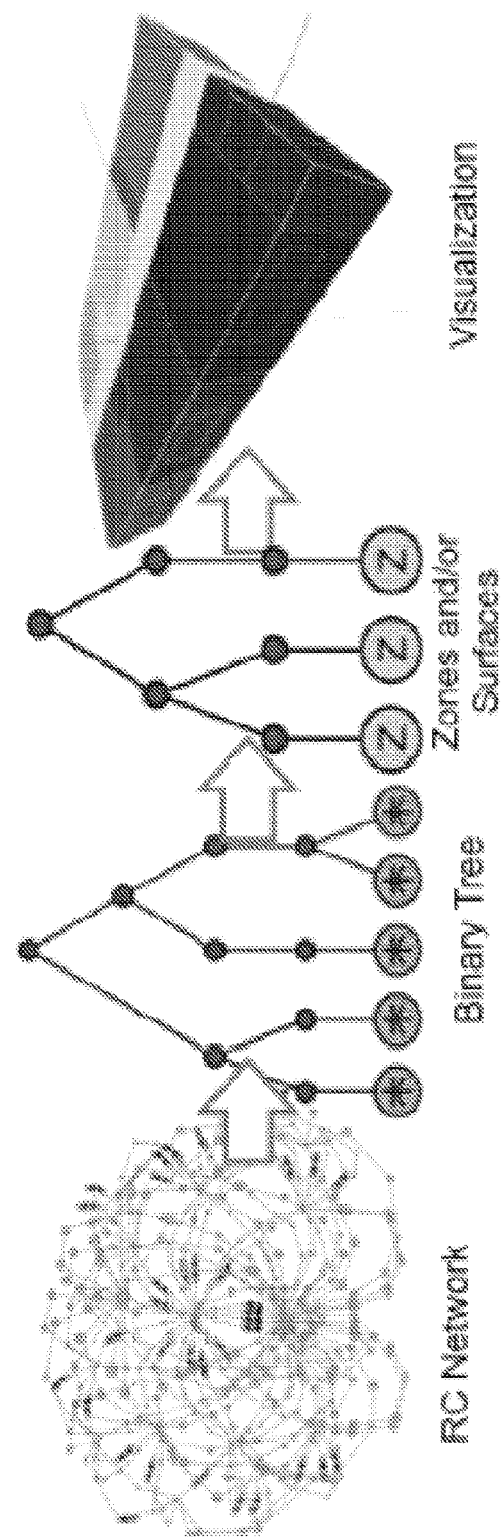
FIG. 2 shows a diagram of an exemplary thermal zoning via resistor-capacitor network aggregation.

Alignment of Occupant, Thermal, and HVAC Zoning. Rooms or spaces are typically placed in groups called zones. In principle, HVAC zoning is designed to meet loads induced by occupant (e.g. ventilation) and thermal (e.g. external gains) loads. In practice, zoning is largely driven by the intuition of the designer. Suppose the degree of occupant, thermal, and HVAC coupling among spaces was each described by a graph, where each vertex is a space and each edge is the degree of coupling to another space. Then, the alignment of each of those graphs largely determines the building performance with respect to comfort, efficiency, and controllability. For example, an architectural program typical lumps together spaces into zones with similar intended space function and usage patterns from the occupant perspective. Thermal zoning lumps together spaces that are tightly thermally coupled. In contrast, HVAC is the most common sense of zoning, and simply corresponds to a collection of spaces served by a single thermostat. Efficiency and performance of the building can be significantly be effected by the conflicts among the different senses of zoning. Common issues involve: laboratories (e.g., require 100% outside air ventilation) and office spaces on the same air-handling unit (e.g., architectural-HVAC conflict); and zoning spaces with high solar gains with internal zones (i.e. thermal-HVAC conflict). Recent work has investigated methods for discerning the thermal zoning via aggregation methods, see FIG. 2. Similarly, simulated load data has been examined, thereby combining thermal and occupant aspects, to suggest HVAC zoning.

Impact on BPMS. The above are examples of shifts in building systems architecture that would enable a high performance BPMS. Removing simultaneous heating and cooling can effectively increase capacity and throughput by decreasing redundant loads. Spatial/temporal redistribution of loads can effectively increase system capacity by redistributing loads within the building or shifting the loads in time. Lastly, the confluence of occupant, thermal, and HVAC zoning is indicative of the gap in building performance.

Layer 2: Actuation and Sensing

The Sense and Actuate layer is the hardware/software interface through which Layer 3 controls the states of each zone through commands sent on the building control network. It also includes the network of sensors available in today's smart buildings that detect occupant, weather, building environment, and energy data.

A number of researchers are engaged in developing device drivers for building devices (e.g., fans, motors, etc.) as part of a building hardware/software stack. Moreover, building sensor networks—using both hard sensors and cell phone-enabled "soft sensors"—have been extensively researched. The disclosed technology determines a set of power states and their characteristics that enable effective fine-grain adaptive power management for the variety of building zones whose occupancy is variable and unpredictable (offices, meeting rooms, hotel sleeping rooms, etc.).

Actuation Using Power States

Figure 3:
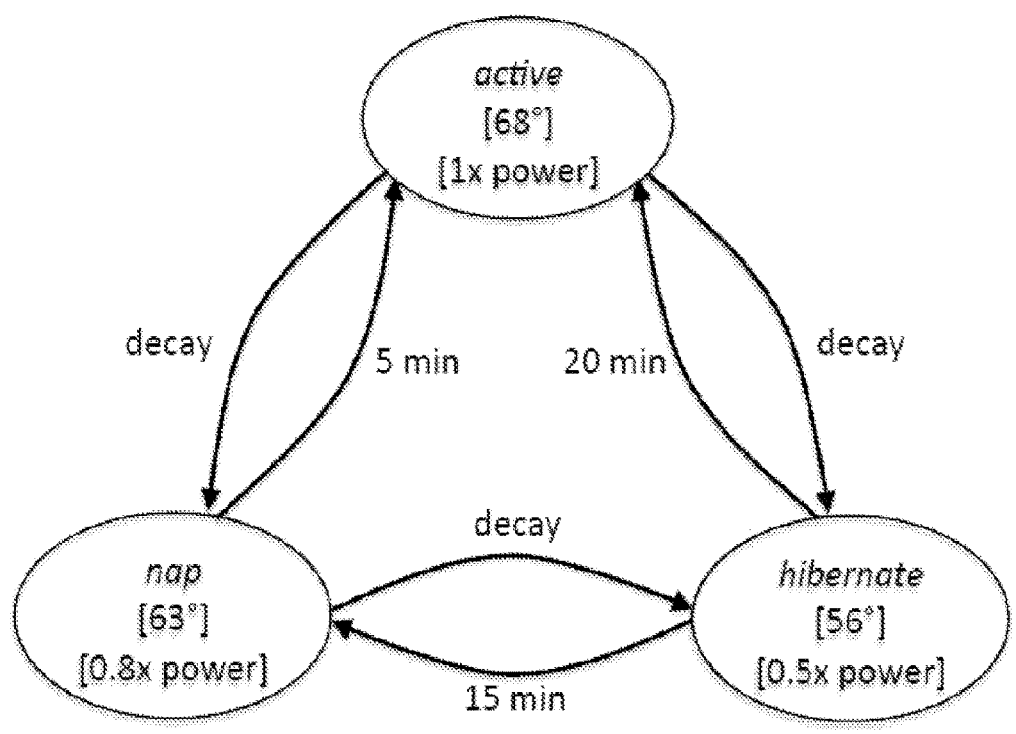
FIG. 3 shows a state diagram for an exemplary building zone with one active and two sleep states.

FIG. 3 shows a state diagram for an example of a building heating zone implementing three power setting states with three different zone temperature settings: an active state with a temperature setting that provides the most cooling or heating in the zone (high power consumption), a nap state with a temperature setting that provides intermediate cooling or heating in the zone (intermediate power consumption), and a hibernate state with a temperature setting that provides minimal or no cooling or heating in the zone (low or now power consumption). Other power setting states may also be added. Such different power setting states differ in set temperature and steady state power and are used to meet different temperature control needs to save energy. Each state transition from one power setting state to another incurs a transition time cost. For example, the transition to a lower temperature state is achieved by letting the room decay; conditioning resumes once the desired set temperature is reached.

A zone is placed in the active state when is it being used, or use is imminent. Hibernate is effective for an unoccupied zone when there is high expectation that use is not imminent, and there is sufficient time to transition to the active state for the time of next use.

The nap state permits additional power savings over hibernate. While the power savings in nap is less than hibernate, transitioning from nap to active is much quicker than from hibernate to active. Thus, nap can save power under circumstances where hibernate would be ineffective:

(1) When a currently unoccupied zone has a high probability of being unexpectedly occupied and the transition time from hibernate to active is too long to condition the room quickly enough before its use. Such "high uncertainty" zones can be placed into nap and quickly transitioned to active if the Power Manager predicts an impending use of the zone.

(2) For short unoccupied periods where there is insufficient time to transition from hibernate to active. The nap state can be exited more quickly and used for these short time scales.

(3) For short unoccupied periods where the power costs of transitioning to hibernate and back to active exceed the savings. The lower transition energy of nap may make it suitable in some of these cases.

The nap state may also be used in coordination with hibernate when a currently unoccupied zone is expected to become occupied after a specific time and trigger event; where there is not enough time after the trigger to awake from hibernate; but there is sufficient time to awake from nap. For example, the Power Manager may transition a hotel sleeping room from active to hibernate on check-out, to nap as check-in time approaches, and to active when the new room occupant (guest) arrives at the hotel. If the nap state were unavailable, the Power Manager would put the room into active as check-in time approaches, which could needlessly fully condition the room for hours.

While FIG. 3 shows a single active state, having additional active states that use less power in exchange for comfort permits the Power Manager to trade off some comfort loss for power savings, for example, during potential brown-out periods or when the price of energy is at a premium. This approach can be referred to as Dynamic Conditioning Scaling (DCS) since it is analogous to Dynamic Voltage and Frequency Scaling (DVFS) used in microprocessors, where throughput is traded for power savings by scaling down the voltage and frequency.

With DCS, the Power Manager can also prioritize service in a similar way that computer servers and networks, given limited compute power and bandwidth, deliver different levels of QoS to compute jobs and network packets of differing priority. For instance, the Power Manager in a hotel may choose different active states for different customers, e.g., meeting versus sleeping rooms, or "premium" versus regular customers, to deliver slightly degraded comfort in select zones in order to reduce overall building energy usage when the cost of energy is high.

Sensors

Table 3 shows the sensors that can be readily implemented in the BPMS Sense and Actuate layer based on the current state-of-the-art in sensors and sensor networks. The novelty of the BPMS lies in the application of this sensor data to dynamic fine-grain building power management and scheduling as described in the next two sections.

TABLE 3

Examples of sensors available in smart buildings.

| Type of Sensors | Examples |
| --- | --- |
| Occupancy | Motion detectors |
|  | Optical tripwires |
|  | Cameras |
|  | Smartphones |
| Weather | Temperature |
|  | Cloud cover |
|  | Humidity |
|  | Sun position |
| Building Environment | Zone temperatures |
|  | Zone humidity |
| Energy | On-site (solar/wind) energy forecast |
|  | Grid pricing forecast |

Layer 3: Dynamic Power Optimizations

Stochastic Control of Power Allocation over Multiple Zones: The disclosed technology can adaptively operate HVAC systems in the most cost efficient way possible over time by responding to stochastic events like weather, prices, room occupancy, room scheduling, and other factors. This would include making use of power in time periods when it is cheaper (by pre-conditioning) and the use of chilled water tanks as well as thermal storage in the structure. This problem can be formulated as a stochastic control optimization. This formulation and solution method is designed to be computationally efficient for buildings with a large number of rooms or zones and to incorporate learning to improve solutions over time as well as to incorporate stochastic factors including weather and room occupancy.

Stochastic Control: Equation (1) shows the following multi stage stochastic control problem:

$$\min_{P} \mathbb{E}_w \left\{ \sum_{t=1}^{NT} [K_p(P_t, w_t) + \gamma K_c(P_i, t, X_t, w_t) + F(X_{NT})] \right\} \quad (1)$$

where t is time (approximately hourly increments) with t=1, . . . . NT and NT<25 for example, $\min_P$ is the minimum over the decision vector P, with components $P_t=(P_{t1}, \ldots,$ $P_{t,Z}$) for each time period t and zone i=1, ..., Z. P is a vector of the total building power allocation $P_t$, t=1, ..., NT, in each time period t and zone i. $E_w$ is the expected value over random variable w.

The thermal state $X_t=(X_{t,1}, X_{t,2}, ..., X_{t,Z})$ in (1) is a vector describing thermal storage at time t (in building walls and air temperature) in each zone i, with zones possibly including a storage unit like a chilled water tank (to be able to consider taking advantage of low cost night time electricity or more power efficiency if a room temperature changes gradually rather than suddenly). So $X_{t,i}$ is the thermal storage in the $i^{th}$ zone (with a total of Z zones) and t is the time period. In (1), $X_0$ and $F(X_{NT})$ are given and NT occurs at a good transition point (e.g., middle of the night). $F(X_{NT})$ is the value if the state of the system is $X_{NT}$ at the end of the horizon (at time t=NT) so this accounts for the value of thermal storage after period NT.

The connection between power allocation $P_t$ and thermal states $X_t$ and random factors $w_t$ can be computed from a building simulation model of the disclosed technology (which, in some examples, can be a complex model like Energy Plus or a quickly computable function, e.g., a control oriented model). This building model can be called the vector function G so that $X_{t+1}=G(P_t, X_t, w_t)$. Imbedded in the calculation of G is the operation of the HVAC systems. $w_t$ is a vector of random variables in period t (primarily for weather, room occupancy and real time power prices), and γ is a weighting function between cost for power $K_p(P_t, w_t)$ and comfort $K_p(P_t, t, X_t, w_t)$. Real-time prices is incorporate, $K_p$ is a function of random vector w and $K_c$ is also dependent on w, which includes weather and occupancy factors.

One option is to solve Equation (1) by stochastic dynamic programming with a continuously valued state vector so the problem is then expressed as:

$$F_t(X_t) = \min_{P_t} \mathbb{E}_w[K_p(P_t) + \gamma K_c(P_t, t, X_t, w_t) + P_{t+1}(X_{t+1})] \quad (2)$$

To permit stochastic analysis of a larger number of zones, this problem can be solved in (2) by a new variant of stochastic dynamic programming with a response surface approximation, which can be included in the disclosed technology. Previously, B-splines and MARS regression have been used as response surfaces in stochastic dynamic programming and have shown dramatic increases in accuracy for a fixed amount of computation. For example, the B-spline example indicated the ratio of computation time with B-splines to the computation without the B spline response surface was about $(0:4)^Z$, where Z is the dimension of the state variable (which is the number of zones in (2)). More recently neural nets and other approximation methods have been used under the term "Approximate Dynamic Programming."

For example, in the disclosed technology, Radial Basis Functions (RBF) can be used as response surfaces with stochastic dynamic programming. This would be a new innovation for nonlinear stochastic optimal control, in buildings. The surrogate response surface approach has been applied to higher dimensional problems so it would appear that higher dimensions (e.g. many zones) could be possible. As an extension. Zones could each contain multiple rooms to deal with higher dimensional problems. The disclosed technology here is an improved method that can make the computational cost for continuous stochastic optimal control much smaller for systems with a large number of zones. This can make optimal stochastic control of large numbers of connected zones more feasible.

The temperature results computed by the optimization can then be transformed into the heating states: active, nap or hibernate.

Actual Policy Implementation and Distribution: Equations (1)-(2) can be computed to determine how power and thermal storage should be allocated among time periods. However, when a decision is implemented in period t, the value of the random variable $w_t$, (e.g., occupancy and weather) will be known with high probability, so the best value of the detailed building wide HVAC decisions can be recomputed, and use those as the actual decision. At this point, for example, decisions on an even finer time scale (e.g., 15 minute intervals) can be obtained by expanding for example to a 4 period analysis. The calculations can be done in parallel and distributed among zones.

Learning: The information collected can be used to as feedback to improve operations of the system over time, e.g., by building response surfaces with Radial Basis Functions, which are a type of spline. The control systems can be operated for a long time, and all the data can be saved that is collected about the values of $K_c(P_t, t, X_t, w_t)$ in (2) and of the future value function $F_t(X_t)$. For example over the course of a year, $K_c(P_t, t, X_t, w_t)$ can be solved over 8700 times, and a multivariate response surface can be built from that information, and thereby reduce the number of times a relatively expensive simulation model, e.g., like Energy Plus, needs to be run.

Comparison to other methods: In the last decade, an increasing number of papers have demonstrated receding horizon optimal control framework of building systems, commonly referred to as Model Predictive Control (MPC). However there exist significant challenges with respect to the scalability of such an approach in terms of computation and implementation especially for stochastic analysis, which is necessary to incorporate uncertainty of prices, occupancy, and weather, for example. The disclosed approach embodies a self-learning distributed predictive control approach. Some work has evaluated distributed MPC for a small collection of four to six rooms/zones in building simulations, and a more recent paper looked at 20 zones but with a fairly simple and very quick building model.

The disclosed method can be compared against existing explicit, online, and distributed MPC methods. Exemplary estimation of flops indicates that the disclosed system is much faster for the stochastic system when the number of zones Z becomes larger. For example, numerical comparisons of the algorithms to understand the pros and cons of each method as a function of the level of stochasticity and the dimension Z can be performed.

The exemplary approach can be transformational by using an approach for stochastic control (with RBF response surface stochastic dynamic programming not previously used) that has the potential to be much vastly more efficient at optimizing systems with a large number of zones/rooms given uncertainty. In addition, for example, the response surfaces can be used to store prior calculations and thereby "learn" how to better operate the system. Comparisons can be performed between the solutions with and without the surrogate response surfaces to quantify the contribution to solving building optimization problems associated with using this new optimization approach with RBF surfaces.

Layer 4: Resource Scheduling and Nudges

While the Power Manager makes changes in power states based on a short time horizon, the Scheduler at the top of the BPMS identifies long term power savings through data analysis and interaction with the Power Manager and building occupants (FIG. 1). The Scheduler mines the filtered sensor data from the Level 2 interface to improve energy efficiency. It discovers trends that are passed to the Power Manager to improve its optimization. It learns preferences from building occupants and "nudges" them to take actions that are more energy-friendly, e.g., through accurate cost savings estimates of lowering room temperature, occupants may opt for lower thermostat settings. Identifying effective occupant "nudges" is part of the deployment plan, which is described in the next section of this patent document.

The Scheduler also achieves long term power savings through energy-aware assignment of schedulable building resources. The meeting rooms in an office building are currently manually assigned to scheduled meetings using criteria that, at best, roughly account for the energy cost of the schedule. For example, "capacity matching" is typically the only criteria for assigning meeting rooms to meetings; yet an optimal algorithm that accounts for other factors, such as the thermal momentum from a prior scheduled meeting, can produce a schedule that uses far less meeting room energy than capacity matching alone. Thus, automated scheduling of the location of meetings can be done unobtrusively with knowledge of user preferences while saving significant energy.

The described Scheduler assigns schedulable resources in a way that leads the Power Manager to select an energy-optimal set of meeting room power states. A previous exemplary algorithm assumes one active and one sleep state and uses a few simple static factors to find a solution that meets timing and capacity constraints. The previous exemplary algorithm does not account for multiple sleep states, transition time/power costs, and the HVAC design, e.g., the placement of heat exchangers to awake meeting rooms from sleep states. Moreover, unexpected events such as fewer/more attendees and impromptu meetings may cause room conditioning costs and the actions of the Power Manager to differ from that anticipated by the algorithm, or cause unacceptable comfort. By incorporating event probabilities that are learned over time (e.g., for instance, Bob and Carol frequently hold an unscheduled meeting in conference room A on Tuesday mornings), the scheduler can improve energy efficiency and avoid discomfort. The scheduler can also use filtered data collected from the Level 2 interface during meetings as feedback to improve the algorithm.

The disclosed new meeting room scheduling algorithm accounts for multiple active and sleep states, the transition time and power costs for the conditioned zones, stochastic events, and feedback from prior schedules. Experience with meeting room scheduling can be leveraged towards two additional algorithms: (1) a hotel sleeping room scheduler that assigns sleeping rooms to arriving guests while minimizing energy and meeting user preference goals, and (2) a final exam meeting room scheduler that find an estimated minimum energy assignment of courses to exam rooms.

Exemplary Implementation Plan and Quantification of Potential Impact

The described BPMS approach can be implemented and refined through the four implementation plans shown in Table 4.

TABLE 4

Experimental plan.

| Experiment | BPMS Levels Tested | Comments |
| --- | --- | --- |
| Hencey Lab | 1, 2 | Modeling alternative BSAs |
| | | Automatic Level 1 to Level 2-3 translation |
| On-campus | 3, 4 | Occupancy-driven power management |
| Experiments | | Sleeping room and final exam room scheduling |
| Simulation | 1, 2, 3, 4 | Large and small scale deployments |
| Testbed | | Multiple buildings types |
| | | All layers fully implemented |
| Residential | 1, 2, 3, 4 | Massive data collection & analysis |
| Deployment | | Learning and nudges |

(1) A coherent software toolchain can be implemented for integrating each level of the stack. For example, tools can automatically translate Level 1 information for Level 2, e.g., such as (a) an appropriate optimization-oriented model and (b) cost functions and constraints for the optimization. This work can include co-simulation and building application stack. For example, this work can expedite the evaluation of design alternatives which normally require manually setting, as previously described. As a result, this work can compare a number of building systems architectures, where similar work tends to painstakingly develop results for a single architecture. The framework is discussed in more detail in the next subsection.

(2) Smartphone-based occupancy sensors that track, log, and analyze occupancy movements can be implemented. For example, an EnergyPlus model of the Cornell Statler Hotel can be used in an energy-aware sleeping room scheduling algorithm. Results from the algorithm can be used to market the tool to hotel management for possible deployment and validation.

(3) A simulation test-bed that models residential, office, and hotel buildings can be implemented based on an enhanced version of the EnergyPlus simulator, as well as custom building modeling and analysis software. The successful implementation of such can involve power management optimization algorithms in computer systems simulators. State characteristics can be derived.

Figure 4:
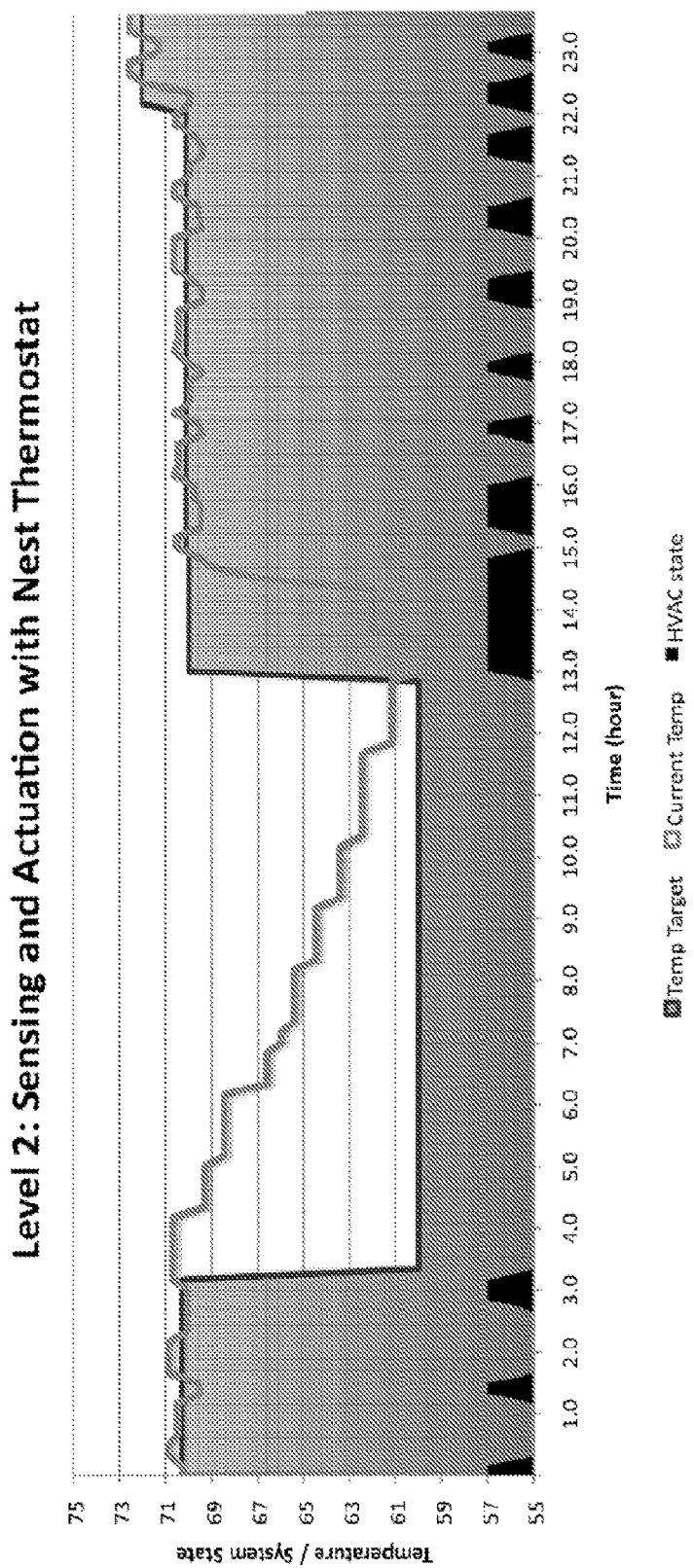
FIG. 4 shows a plot of exemplary data for a given day for an actual user.

(4) Part of an exemplary BPMS using off-the shelf components can further be deployed and develop the stack. Level 2 of the stack is sensing and actuation. Internet-enabled residential NEST thermostats (off-the-shelf) can be used, e.g., sensors for 10 residential households. Data on temperature, HVAC on/off system state, occupancy, thermostat set-points and human interaction with the thermostats can be logged at about 10-minute intervals. FIG. 4 shows a plot of exemplary data for a given day for an actual user.

FIG. 4 succinctly displays some of the ideas used in the exemplary BPMS technology. This user has a nighttime setback; in the figure, temperature target is setback from 70° F. to 60° F. from 3:00 h to 13:00 h. In the exemplary nomenclature, 60° F. is one of the sleep states. Recovery from 60° F. to 70° F. occurs from 13:00 h to 15:00 h. Hence, recovery time of 10° F. is 2 hours. For these two hours, the heater is continuously on. Thereafter, the heater is on for about fifteen minutes every hour to maintain the temperature at 70° F. Also, it is noted, for example, that the jaggedness is an artifact of the time scaling and rounding of and not an actual physical phenomenon; and that the Nest thermostat also has a visual occupancy sensor at the location of the thermostat (e.g. living room) that provides information about when the occupant is at home—however, for example, the way this is reported is partially masked and only reported if the user configures the device to report it.

The exemplary plot in FIG. 4 is for one day. Further exemplary data and information for this user for 30 days or more can be demonstrated, and further exemplary data logging is continuing. The exemplary Level 2 information can then pass to the Level 3 and Level 4 parts of the stack for Power Management and Behavioral Nudges.

Implementations of the disclosed technology have collected exemplary data on 10 buildings/users, e.g., for up to 1 month, using several different types of heating fuel, house sizes, and climates from Minnesota to Arizona. It is important to note that every building is different. Hence, a protocol such as the disclosed BPMS is made aware of these differences. For example, simple universal rules applied to all buildings like, "Turn on the heater two hours before return" are bound to fail sometimes and be overkill in other buildings.

In some examples, Level 3 may be provided by the Nest thermostat through their exemplary algorithms. In some examples, alternative stochastic, predictive, energy conservation actuation is provided. This may be in the form of user requirements (e.g., probability people will be home inferred from historical sensor data, comfort levels solicited from the user), incorporating costs, and then changing the control algorithm of heater state to meet occupant requirements. A simple example is correctly tuning the time to move from the sleep to active state. In FIG. 4, for example, if the occupant arrives home at 5 pm, then the power management can be considered suboptimal because power could be saved by waiting until 3 pm to turn on the heat.

Level 4 can include scheduling and behavioral nudges. Two examples include use of space heater to further drop the nighttime setback. In one example, this has been implemented on a user's house and realized about $100/month annual savings. This could be augmented by adding additional sensors, e.g., off the shelf, Nest Thermostats can be deployed throughout a house to sense multiple locations. Another exemplary component can include behavioral nudges where changes in planning/scheduling/behavior to save energy can be suggested. Examples:

"If you set your thermostat back 1 degree, you will save $Z per day. Is this okay?"

"Can we learn from your preferences? We will occasionally set back your thermostat slightly and observe whether you override this by turning it back up. We will also ask if you are comfortable via text message and use that to develop algorithms."

In some cases of implementations with BPMS technology, it may be possible to inexpensively change elements of a buildings Level 1 (Building Architecture). In others, these may be fixed.

An Exemplary Implementation. In some implementations, the disclosed technology can be distributed in 1600 Nest thermostats for an exemplary BPMS deployment. In one example, exemplary software of the disclosed technology is logging 10 thermostats. The exemplary software can scale for logging capability of 1600 thermostats, or more. To incentivize participation, thermostats can be initially loaned or given to residents for free conditional on their participation on data logging. Human subjects protocols is followed when collecting personally identified data.

Automated Design, Implementation, and Verification

Due to economies of scale, advanced control methods have deeply penetrated and transformed the aerospace, automatic, and processing industries. However, most building energy systems are comprised of uniquely combined and configured generic components. As a result, the economies of scales are not currently present to dissipate the expense of the time and expertise intensive processes for design, implementation, and verification of building automation systems.

Specific implementations of some functions in Layer 3 and Layer 4 discussed above are provided in examples in FIGS. 5, 6 and 7.

Figure 5:
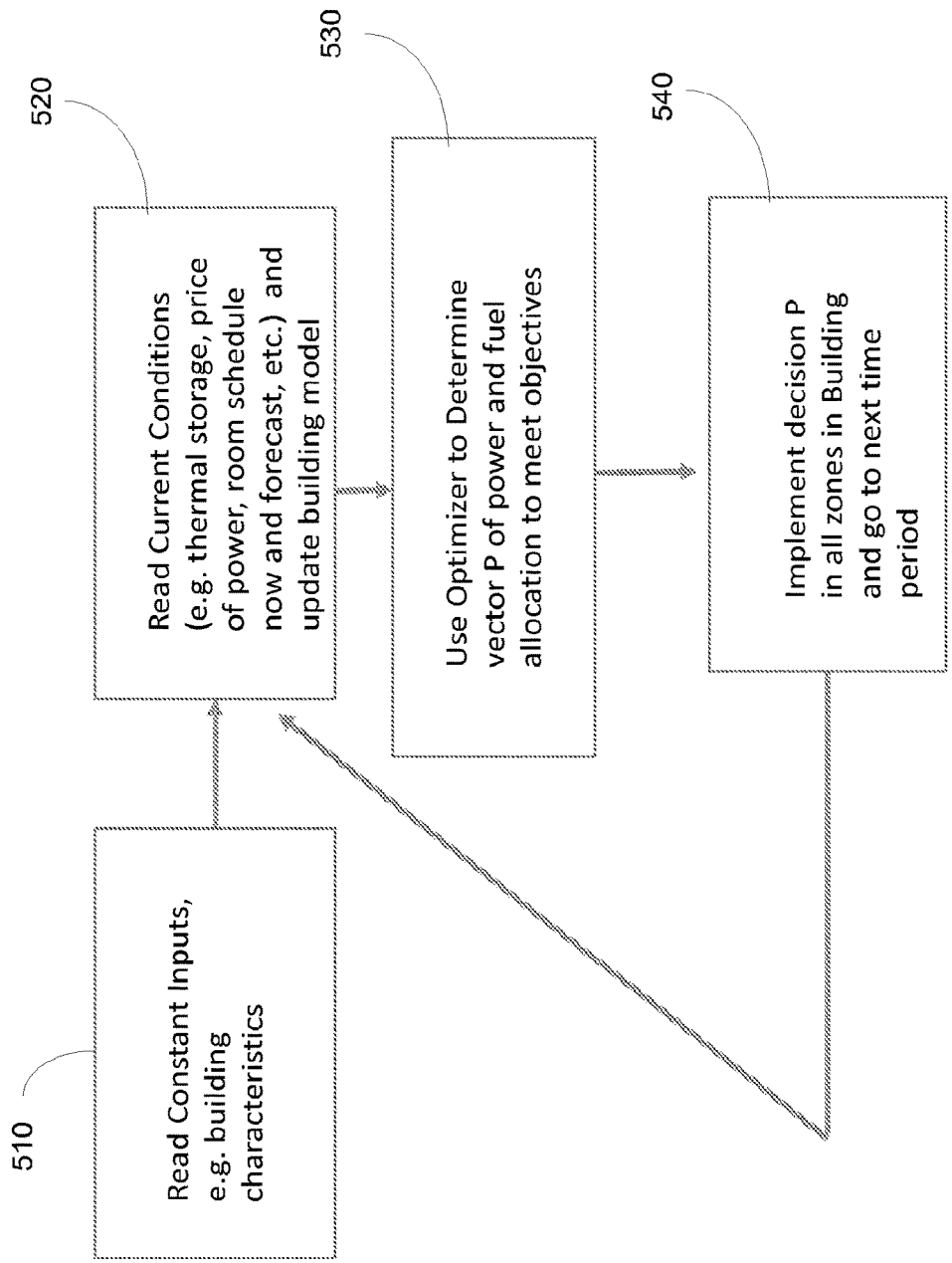
FIG. 5 shows an example of an optimization process in Layer 3.

FIG. 5 shows an example of a process in Layer 3 for performing an optimization process. At step 510. Layer 3 reads or receives various input information on the building hardware or building characteristics as represented by the structures, devices, or appliances in Layer 1. At step 520, Layer 3 reads or receives additional input information from Layer 2 (e.g., thermal storage) and from Layer 4 (e.g., room schedule for the current time and forecast). Based on the received data and information, Layer 3 operates its Optimizer software to determine the optimal allocations of power and fuel to meet various objectives or requests. The power state settings associated with the determined optimal allocations in the building are sent to Layer 2 for the Actuation Software to generate appropriate control sequences to be sent to Layer 1. Layer 3 then proceeds to process the updated input information from Layer 1, Layer 2 and Layer 4 to perform the next round of optimization. This process is dynamic and the power state settings generated by the optimization process change as the received input information changes to maintain the power settings in the building at optimized states for improved energy efficiency while meeting the needs of building occupants.

Figure 6:
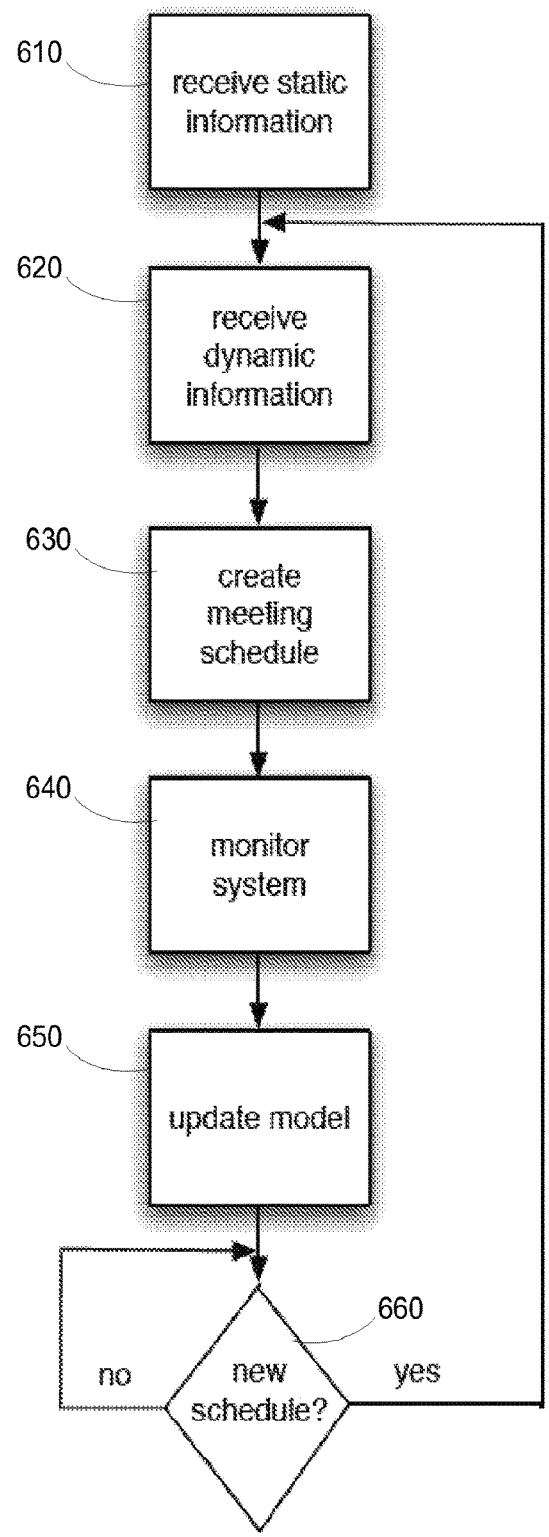
FIGS. 6 and 7 show examples of two processes in Layer 4 for scheduling and for generating suggestions or incentives to building occupants.

FIG. 6 shows an example of a scheduling process in Layer 4. This scheduling process receives information related to scheduling of use of building resources such as conference rooms. The received information includes static information (610) for certain fixed meetings to be held including conference room locations, sizes, amenities, and so on and dynamic information (62) for changes in pre-scheduled meetings such as timing, duration, room size or location of rooms, ad hoc meetings or unexpected meeting requests. At step 630, the scheduling process creates a meeting schedule. Next, the scheduling process monitors the status of the scheduled meetings that are scheduled at various conference rooms. At step 650, an update model process is executed. The scheduling process is iterative and can be repeated based on new dynamic information.

Figure 7:
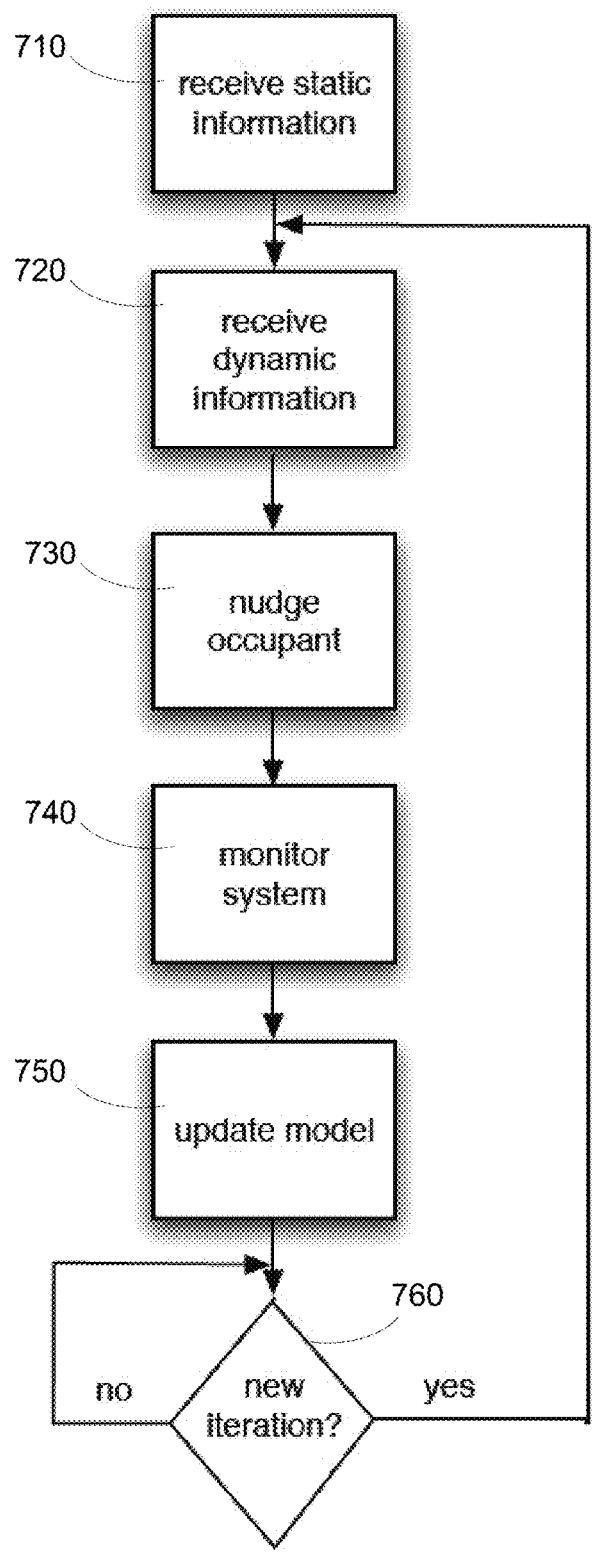

FIG. 7 shows an example of a process for generating a nudge to building occupants in Layer 4. This process follows similar processing steps in FIG. 6 for sending building occupants suggestions, recommendations, rewards or other incentives to building occupants as "nudges" to encourage power-friendly actions that would generally provide better power efficiency.

The design, implementation, and verification of building automation systems (BAS) has historically been a manual, fragmented process with little to no automated information flow from the other elements of the building design process.

Figure 8:
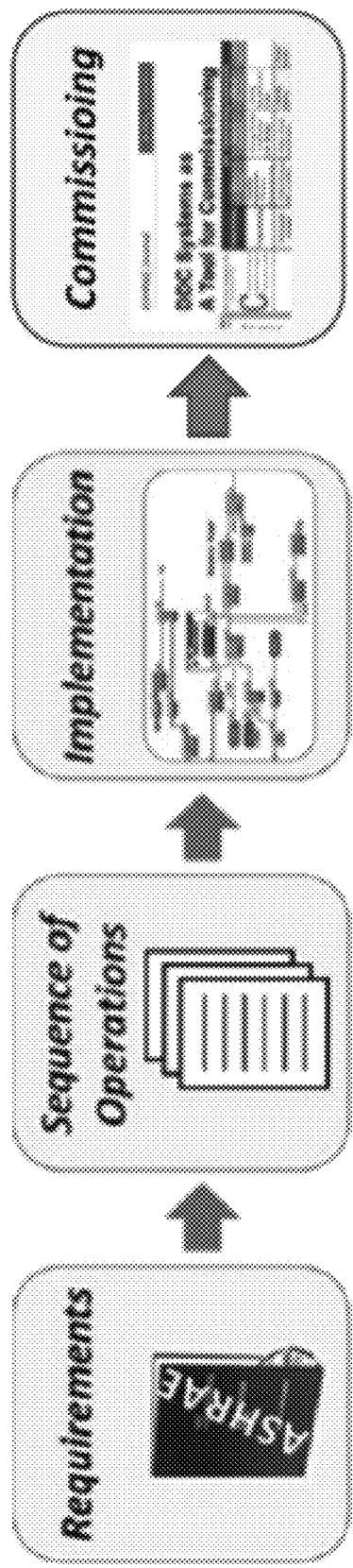
FIG. 8 shows a diagram of an exemplary work flow for an exemplary building automation systems design, implementation, and verification.

FIG. 8 illustrates one example of some current practices for a typical BAS design, implementation, and implementation. First, for example, a design engineer takes the chosen components and configuration and writes a sequence of operations to meet building-code and equipment requirements. The sequence of operations is written in plain English (e.g., "The cooling shall be enabled whenever the outside air temperature is greater than 60 OF AND the fan is on AND the reversing valve is in cool mode."). Second, for example, a controls contractor implements the sequence of operation by translating the sequence of operations in the a language (e.g. extended relay ladder logic) specific to the BAS manufacturer. Last, for example, a small portion of the BAS implementation verified to meet the requirements in the overall building commissioning process.

A framework for a software toolchain is needed that enables scalable implementation of advanced control methods across the nation's building inventory. Software tools have become increasingly for energy analysis of building designs. For example, building energy simulation has become a critical part of the design practice. The Building Controls Virtual Test Bed (BCVTB) and MLE+ enable users to interface advanced control algorithms with EnergyPlus, a popular building energy simulation software. Although a substantial step forward, it is important to note both software tools basically facilitate the import/export of time series data to EnergyPlus, e.g., for the purpose of simulation and black-box modeling.

Such existing software lacks an ability to generate an appropriate abstraction based on model information and relies on simulation to generate data for a blackbox abstraction. As a result, powerful model-based techniques for design, implementation, and verification cannot be easily leveraged for scalable BPMS implementation. The disclosed technology can implement a software platform that is capable of creating and manipulating an object-oriented building energy model of the cyber-physical system. For example, recent work on a building energy modeling platform, called Sustain, has set forth a foundation to address the above deficiencies. Specifically, Sustain is a software platform that has demonstrated a modular and extensible capability to import, manipulate, and export object-oriented building energy models. For example, recent work has demonstrated the ability to generate building thermal models appropriate for optimization directly from the same building energy model used to generate EnergyPlus simulations. In addition, a capability has been demonstrated to directly generate a Modelica model (e.g., an equation-based object-oriented modeling language) from the object-oriented building energy model in Sustain.

Economic, Social, and Public Policy Implications

The disclosed BPMS addresses social, economic, and public policy dimensions of energy efficiency. Foremost amongst makers of public policy is how to get people to adopt energy efficiency upgrades. Rational economic models and engineering estimates suggest people should do more energy efficiency (e.g., like drive Hybrid vehicles), but people do not; this phenomenon is called the energy efficiency gap. An older literature suggests that modeled ex-ante energy savings are much less than actual ex-post savings. For example, it has been found that old buildings use the same amount of total energy as new buildings despite large modeled savings. However, just looking at energy use doesn't account for differences in behavior; new buildings might use the same energy because they are more efficient but don't set thermostats back. Level 2 of the disclosed BPMS technology enables separation of behavior (e.g., where do people set their thermostats) from the building (energy inputs to temperature change outputs). This has profound consequences in developing a market for energy upgrades.

The social dimension of energy efficiency encompasses human-system interface. For example, although programmable thermostats can automate exemplary BPMS sleep states finds that "89% of the respondents never used the programmable thermostat to set a weekday or weekend program." In such cases, people either manually set their thermostats or leave them fixed 24 hours a day. This can be rationalized via theories of Psychology and Economics that emphasize that people are only boundedly rational and loss averse, and hence would choose simple heuristics with suboptimal performance. The exemplary BPMS layers 3 and 4 sense actual usage requirements and intelligently suggests better control algorithms and thermostat settings. BPMS layer 2 enables site-specific feedback. Current energy advice is of the form, "Lowering your thermostat 1 degree saves 2% of your heating bill on average." With building-specific data, that can be improved to, "Lowering your thermostat 1 degree will save you exactly $50 this month."

The economic dimension encompasses a broad range of issues. People consume energy services (thermal comfort), not energy directly. Energy use has both a direct cost and contributing to climate change is a negative externality. To be economically efficient in achieving a climate change goal, economies should priorities those greenhouse gas (GHG) reductions that are cheapest. According to the most-widely known and infamous GHG abatement curve (produced by McKinsey, republished in National Geographic), there are large amounts of "$CO_2$ cuts that save money", e.g., they pay for themselves through savings in direct costs. Out of annual U.S. emissions of roughly 7 billion tons of $CO_2$, building energy efficiency has reductions of 300 million tons, or about 4%. A 300 million ton reduction represents a 40% of the needed reductions to reduce US GHG emissions to 1990 levels. US households spend an average of $830 on space heating and air conditioning. These building energy efficiency projects would pay for themselves over time and would save households roughly $250 per year on average assuming a 30% reduction in space HVAC expenditures. However, field-verified building specific information is not available. The exemplary Level 2 of the BPMS technology implemented before energy efficiency upgrades are implemented can enable accurate, credible characterization of building savings and how savings vary by region and other housing attributes.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them.

Figure 9:
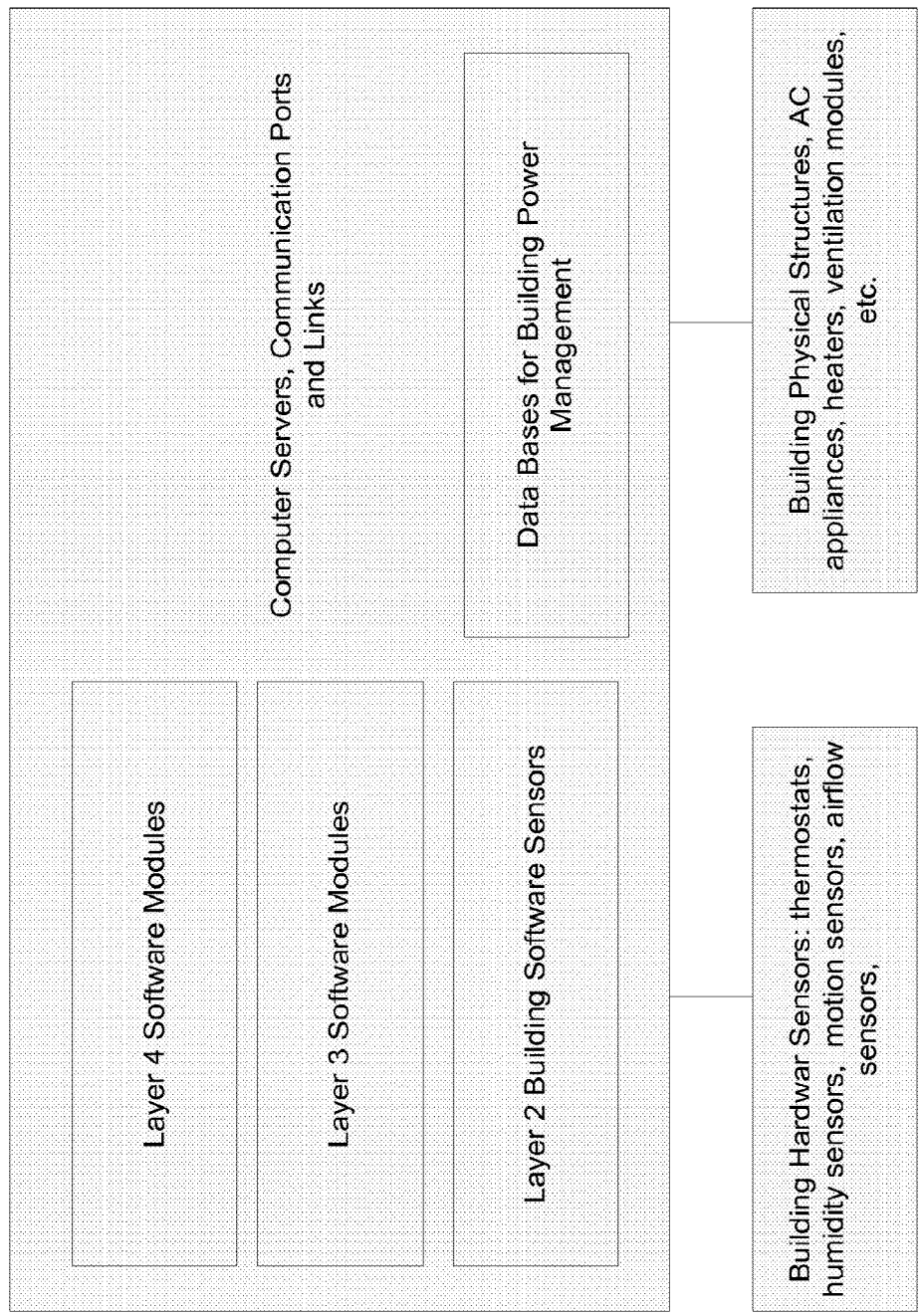
FIG. 9 shows an example of a system implementation of the disclosed technology based on the four layers.

FIG. 9 shows an example of a system implementation of the disclosed technology based on the four layers. The software sensors, software processing modules and databases associated with the system are implemented on one or more computer servers and suitable communication ports and links for communication over a network or with the hardware parts of the system such as the hardware sensors in Layer 2 and the AC appliances, heaters, ventilation modules, etc. in Layer 1.

Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for managing power in a building, comprising:
    hardware sensors distributed in a building to obtain measurements and data from the building; and
    one or more computer servers in communication with the hardware sensors and power appliances in the building including appliances for heating, ventilation, or air conditioning (HVAC) in the building,
    the one or more computer servers including software modules that receive sensor data from the hardware sensors, receive information on preferences or requests from building occupants, process information in the sensor data received and information from building occupants to dynamically optimize operations of power appliances and use of building resources to generate optimized power state settings of the power appliances in the building, and send control sequences to the power appliances in the building to operate according to the optimized power state settings, building,
    the one or more computer servers including information on different pre-set power state settings of the power appliances in the building at different power consumption levels, and are programmed to:
    set a zone in the building at a first power state setting selected from the different pre-set power state settings as an initial default power state setting for the zone based on an expected initial need of a temperature control in the zone;
    initiate a transition of the zone from the first power state setting to a second, different power state setting when an event is detected to trigger a need to set the zone to the second power state setting; and
    after completion of the transition of the zone to the second power state setting, maintain the zone at the second power state setting until a subsequent event is detected to cause a change in the zone, and
    wherein the control sequences are determined through stochastic dynamic programming using a radial basis function as response surfaces, and the radial basis function is built using a cost of power value, a comfort value, and a weighting function between the cost of power value and the comfort value.

2. The system as in claim 1, wherein the one or more computer servers further include one or more software modules to generate suggestions, recommendations, rewards or other incentives to building occupants to encourage the building occupants to take power-friendly actions that improve building power use efficiency.

3. The system as in claim 1, wherein the one or more computer servers further include one or more software modules that update the power state settings of the power appliances in the building based on currently received sensor data or information from building occupants.

4. The system as in claim 1, wherein the one or more computer servers further include one or more software modules that process requests from building occupants for meetings in the building to provide a meeting schedule in connection with the optimized power state settings of the power appliances in the building to improve building power use efficiency.

5. The system as in claim 1,
wherein the first and second power state settings, and the timing of the transition from the first power state setting to the second power state setting are selected to minimize a total power consumption in the zone while meeting comfort level in the zone.

6. The system as in claim 5, wherein the event for triggering the transition is a timing event.

7. The system as in claim 6, wherein the event for triggering the transition is a time of a day.

8. The system as in claim 6, wherein the event for triggering the transition is a time of a day when electricity is cost differently from another time of the day.

9. The system as in claim 5, wherein the event for triggering the transition is a use event of the zone.

10. The system as in claim 9, wherein the event for triggering the transition is check in of a guest to a hotel room which is the zone.

11. A method for managing building power, comprising:
determining values for power usage of a heating, ventilation, or air conditioning (HVAC) system in one or more zones of a building, the values including a cost of power value, a comfort value, and a weighting function between the cost of power value and the comfort value, wherein the cost of power value is determined based on a total power allocation and random variables, and the comfort value is determined based on the total power allocation, the random variables, a thermal state, and a time period, random variables include weather and building occupancy factors, and the thermal state indicates a vector describing thermal storage at a time period in each zone;
determining a power level for a plurality of states based on the determined values, the plurality of states corresponding to different levels of power to operate the HVAC system in the one or more zones; and
generating, based on the power level, a control sequence to be executed by the HVAC system,
wherein the control sequence includes:
setting a zone in the building at a first power state setting selected from the different pre-set power state settings as an initial default power state setting for the zone based on an expected initial need of a temperature control in the zone;
initiating a transition of the zone from the first power state setting to a second, different power state setting when an event is detected to trigger a need to set the zone to the second power state setting; and
after completion of the transition of the zone to the second power state setting, maintaining the zone at the second power state setting until a subsequent event is detected to cause a change in the zone, and
wherein the control sequence is determined through stochastic dynamic programming using a radial basis function as response surfaces, and the radial basis function is built using the cost of power value, a comfort value, and a weighting function between the cost of power value and the comfort value.

12. The method of claim 11, further comprising providing a message to an occupant in the one or more zones to modify a setting of the HVAC system to reduce the power level.

13. The method of claim 11, wherein the parameters further includes sensor data from sensors to detect environmental and/or temporal factors and decision history data from previously determined power levels for the states.

14. The method of claim 11, wherein the plurality of states include an active state, a nap state, and a hibernate state.

15. A building power management system, comprising:
a heating, ventilation, or air conditioning (HVAC) system in one or more zones of a building capable of operating in a plurality of states, wherein the plurality of states use different levels of power to operate the HVAC system; and
a module that determines a power level for the plurality of states of the HVAC system, wherein the module determines the power level based on a cost of power value, a comfort value, a weighting function between the cost of power value and the comfort value, or a thermal storage value,
a module that generates a control sequence to be executed by the HVAC system,
wherein the control sequence includes:
setting a zone in the building at a first power state setting selected from the different pre-set power state settings as an initial default power state setting for the zone based on an expected initial need of a temperature control in the zone;
initiating a transition of the zone from the first power state setting to a second, different power state setting when an event is detected to trigger a need to set the zone to the second power state setting; and
after completion of the transition of the zone to the second power state setting, maintaining the zone at the second power state setting until a subsequent event is detected to cause a change in the zone, and
wherein the control sequence is determined through stochastic dynamic programming using a radial basis function as response surfaces, and the radial basis function is built using the cost of power value, the comfort value, and the weighting function between the cost of power value and the comfort value.

16. The system of claim 15, further comprising sensors to detect environmental and/or temporal parameters in the one or more zones and actuators to implement an operation of the HVAC system in the one or more zones based on the detected parameters.

17. The system of claim 15, wherein the plurality of states include an active state, a nap state, and a hibernate state.

18. A computer program product comprising a nonvolatile computer-readable storage medium having instructions stored thereon, the instructions comprising:
code for storing a definition of a plurality of states in a heating, ventilation, or air conditioning (HVAC) system in one or more zones of a building, the states corresponding to different levels of power to operate the HVAC system;
code for determining values for power usage, the values including a cost of power value, a comfort value, and a weighting function between the cost of power value and the comfort value, wherein the cost of power value is determined based on a total power allocation and random variables, and the comfort value is determined based on the total power allocation, the random variable, a thermal state, and a time period, and wherein the random variables include weather and building occupancy factors, and the thermal state indicates a vector describing thermal storage at a time period in each zone;
code for determining a power level for the states based on the determined values for power usage; and code for generating, based on the power level, control sequences to be executed by the HVAC system,
wherein the control sequence includes:
setting a zone in the building at a first power state setting selected from the different pre-set power state settings as an initial default power state setting for the zone based on an expected initial need of a temperature control in the zone;
initiating a transition of the zone from the first power state setting to a second, different power state setting when an event is detected to trigger a need to set the zone to the second power state setting; and
after completion of the transition of the zone to the second power state setting, maintaining the zone at the second power state setting until a subsequent event is detected to cause a change in the zone, and
wherein the control sequences are determined through stochastic dynamic programming using a radial basis function as response surfaces, and the radial basis function is built using the cost of power value, the comfort value, and the weighting function between the cost of power value and the comfort value.

19. The system of claim 1, wherein the stochastic dynamic programming is represented by a multi stage stochastic control problem that is given by $$\min_P \mathbb{E}_w \left\{ \sum_{i=1}^{NT} [K_P(P_t, w_t) + \gamma K_c(P_t, t, X_t, w_t) + F(X_{NT})] \right\}$$

where t is time where t=1, ..., NT, where NT is an integer;
P is a vector of a total building power allocation where $P_t$, t=1, ..., NT, in each time period t and zone i;
min is the minimum over a decision vector P, with components $P_t=(P_{t1}, \ldots, P_{tZ})$ for each time period t and zone i=1, Z;
$\mathbb{E}_w$ is an expected value over random variable w;
$X_t=(X_{t1}, X_{t2}, \ldots, X_{tZ})$ is a vector describing thermal storage at time t in building walls and air temperature in each zone i with a total of Z zones; and
$F(X_{NT})$ is a future value of thermal storage after period NT where the state of the system is $X_{NT}$ at time t=NT.

20. The system of claim 1, wherein the multi stage stochastic control problem is solved by stochastic dynamic programming with a continuously valued state vector, and wherein the problem is expressed as:

$$F_t(X_t) = \min_{P_t} \mathbb{E}_w [K_p(P_t) + \gamma K_c(P_t, t, X_t, w_t) + F_{t+1}(X_{t+1})]$$

where $F_t(X_t)$ is a future value of thermal storage after period t;
$K_p(P_t)$ is cost for power;
$K_c(P_t, t, X_t, w_t)$ is comfort value; and
$\gamma$ is a weighting function between cost for power $K_p(P_t, w_t)$ and comfort $K_c(P_t, t, X_t, w_t)$.

* * * * *